DIALING UNITS AND SYSTEMS, FOR TELEPHONE SYSTEMS, AND THE LIKE

Original Filed Feb. 20, 1961

Inventor:
Robert A. Clark, Jr.,
by [signature] Atty.

June 13, 1967 R. A. CLARK, JR 3,325,599

DIALING UNITS AND SYSTEMS, FOR TELEPHONE SYSTEMS, AND THE LIKE

Original Filed Feb. 20, 1961 9 Sheets-Sheet 2

Inventor: Robert A. Clark, Jr.,
by Atty.

See Figure 1.

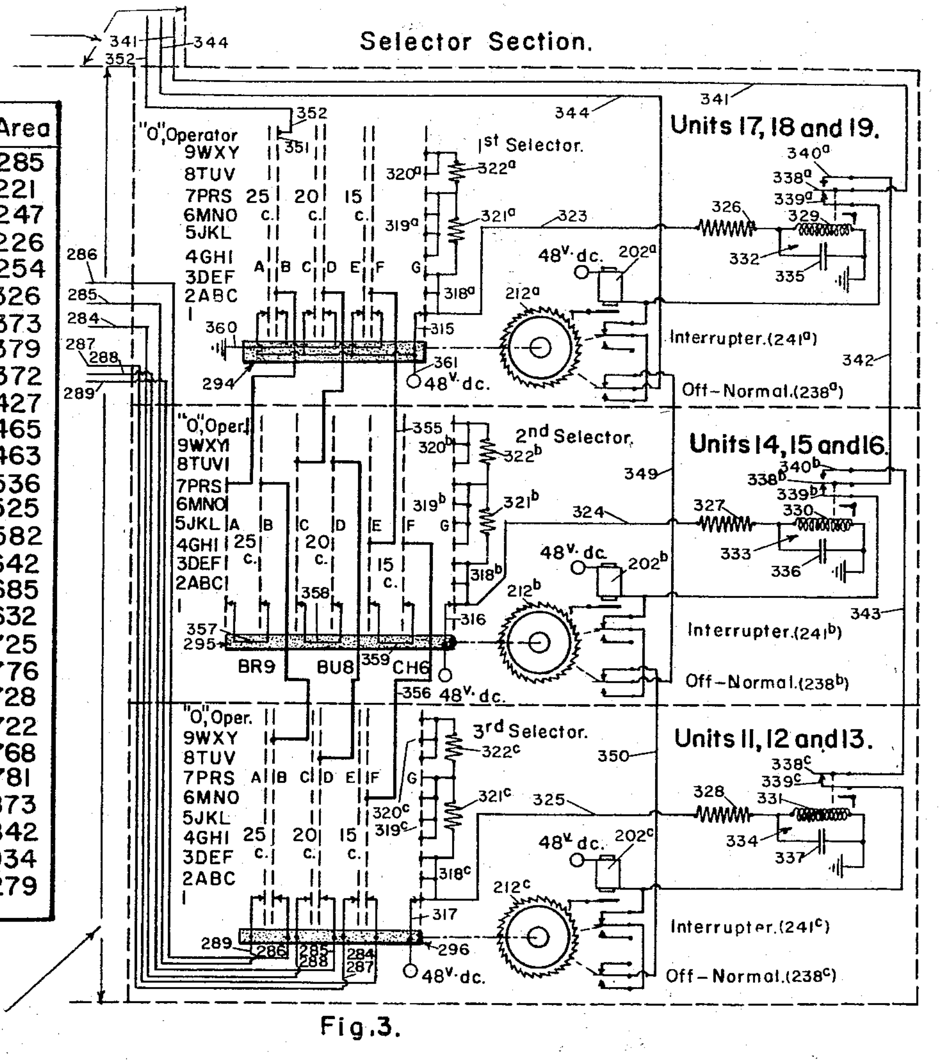

See Figure 2.

Fig. 3.

Strapping Schedule.

| 10 Cent Area X | 15 Cent Area | 20 Cent Area | 25 Cent Area |
|---|---|---|---|
| AM2-262 | ARI-271 | AR6-276 | AT5-285 |
| AU7-287 | AV2-282 | AV6-286 | BAI-221 |
| BE3-233 | BE7-237 | BI 2-242 | BI 7-247 |
| BO3-263 | BO8-268 | BU I-281 | CA6-226 |
| CA8-228 | CE6-236 | CH3-243 | CL4-254 |
| COI-261 | CO7-267 | CR7-277 | DA6-326 |
| DE2-332 | DE7-337 | DO3-363 | DR3-373 |
| EA7-327 | EO4-334 | ES5-375 | ES9-379 |
| EV4-384 | FA4-324 | FI 6-346 | FR2-372 |
| FR6-376 | GR6-476 | HAI-421 | HA7-427 |
| HE4-434 | HE6-436 | HI 5-445 | HO5-465 |
| HU3-483 | HU9-489 | HY3-493 | IN 3-463 |
| IR 8-478 | JU3-583 | JU8-588 | KE6-536 |
| KE 8-538 | KI 5-545 | LA2-522 | LA5-525 |
| LI 8-548 | LI 9-549 | LOI-561 | LU2-582 |
| LU 5-585 | MA6-626 | ME7-637 | MI 2-642 |
| MI 3-643 | MO4-664 | MO6-666 | MU5-685 |
| MU4-684 | NA2-622 | NA5-625 | NE2-632 |
| NE8-638 | NO7-667 | OA4-624 | PA5-725 |
| PE6-736 | PL2-752 | PO7-767 | PR6-776 |
| PR9-779 | PU5-785 | RA3-723 | RA8-728 |
| REI-731 | RE7-737 | SAI-721 | SA2-722 |
| SE3-733 | SE8-738 | SH3-743 | SO8-768 |
| SP4-774 | SP7-777 | ST2-782 | STI-781 |
| SU4-784 | SU7-787 | TA9-829 | TR3-873 |
| TR4-874 | UN8-868 | VA6-826 | VI 2-842 |
| VI 7-847 | WA4-924 | WA8-928 | WE4-934 |
| WE5-935 | WH3-943 | WH5-945 | BR9-279 |
| | CH6-246 | BU8-288 | |

Note: X designates no strapping used.

Fig. 4.

Inventor:
Robert A. Clark, Jr., by Atty.

Inventor:
Robert A. Clark, Jr.,
by Atty.

Inventor:
Robert A. Clark, Jr.,
by
Atty.

Inventor:
Robert A.Clark, Jr.,
by
Atty.

Inventor:
Robert A. Clark, Jr.,
by
Atty.

DIALING UNITS AND SYSTEMS, FOR TELEPHONE SYSTEMS, AND THE LIKE
Original Filed Feb. 20, 1961 9 Sheets-Sheet 8
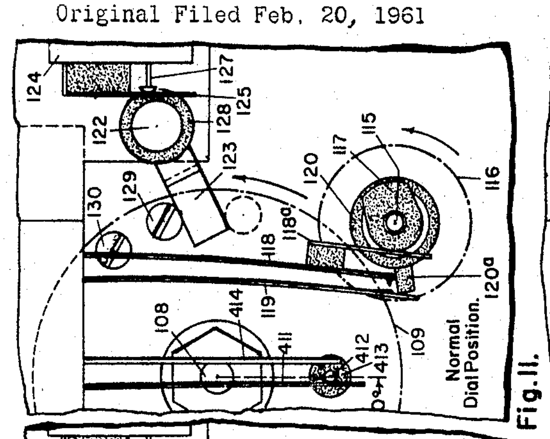
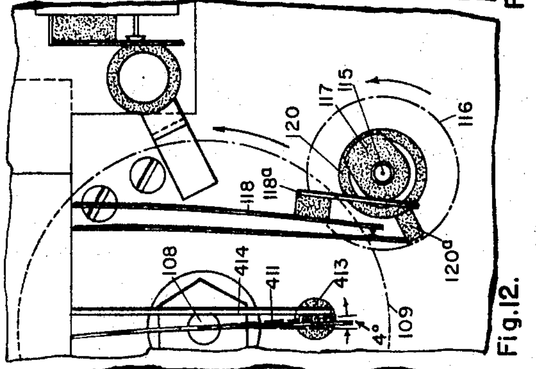
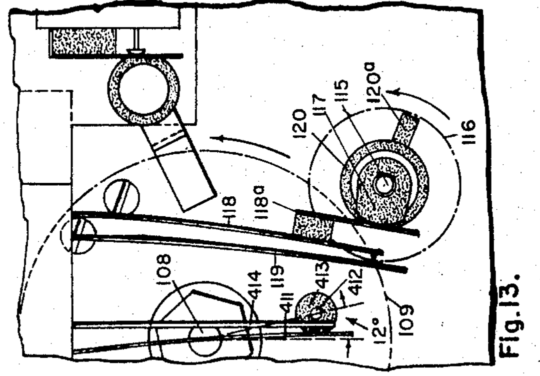
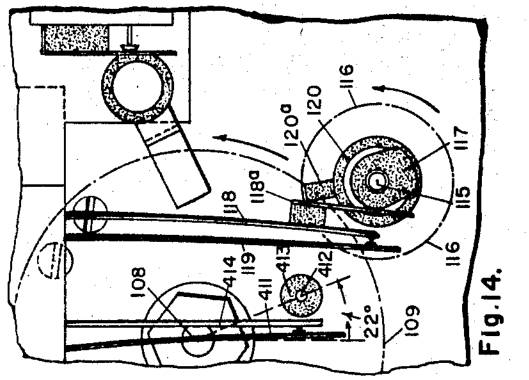
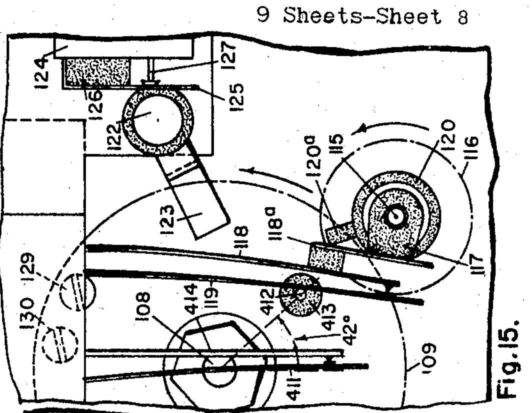
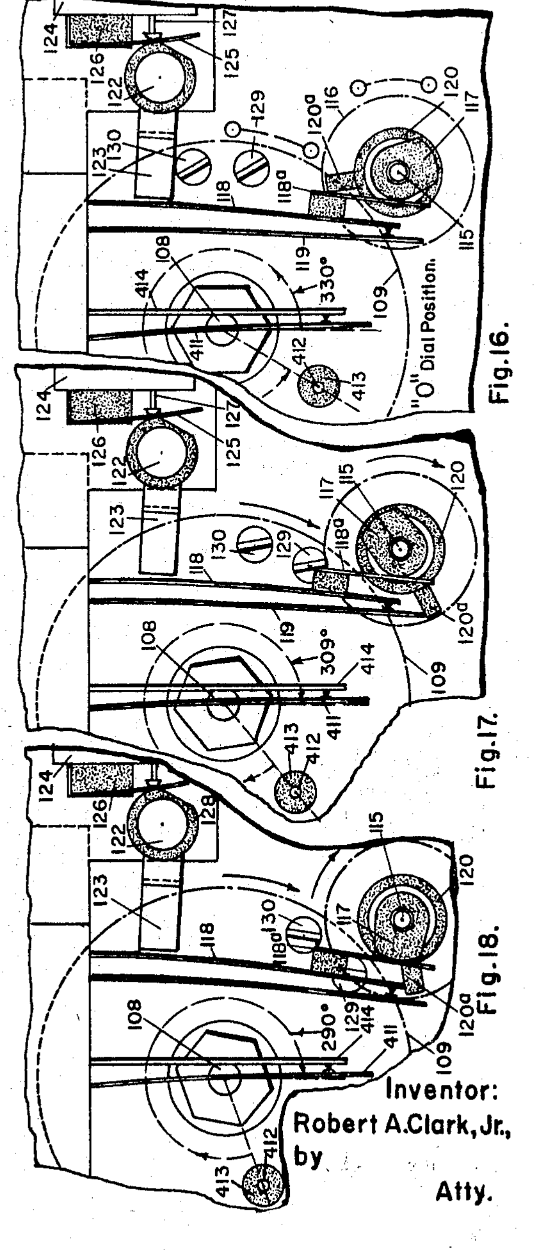
Fig.16. Fig.17. Fig.18.
Inventor:
Robert A. Clark, Jr.,
by
Atty.

DIALING UNITS AND SYSTEMS, FOR TELEPHONE SYSTEMS, AND THE LIKE

Original Filed Feb. 20, 1961

Inventor:
Robert A. Clark, Jr.,
by
Atty.

United States Patent Office 3,325,599
Patented June 13, 1967

3,325,599

DIALING UNITS AND SYSTEMS, FOR TELEPHONE SYSTEMS, AND THE LIKE

Robert A. Clark, Jr., Fort Lauderdale, Fla. (% Communication Equipment and Engineering Co., 5646 W. Race St., Chicago, Ill. 60644)

Original application Feb. 20, 1961, Ser. No. 99,976, now Patent No. 3,221,101, dated Nov. 30, 1965. Divided and this application Sept. 27, 1965, Ser. No. 490,401
7 Claims. (Cl. 179—6.3)

ABSTRACT OF THE DISCLOSURE

A dialing unit for telephones and circuitry therefor, so constituted that when the finger piece is dialed to the high or "0" position, the contacts of a microswitch are reversed to modify the circuitry to which such dialing unit is connected, in manner to prevent the dialing unit from producing pulses during return of the finger piece of the dialing unit, to its starting position.

This invention relates to improvements in dialing units and systems, for telephone systems, and the like.

This application is a division of my co-pending application for patent on improvements in plural zone, time control, pre-pay telephone systems, and the like, Ser. No. 99,976, filed Feb. 20, 1961, now Patent No. 3,221,101 allowed May 19, 1965. The improvements hereinafter disclosed have been devised particularly with reference to their use in connection with dial type calling systems which include time measuring units for registering and indicating the elapsed time of the call after the call has been completed; with provision for producing a warning signal at a prescribed interval before completion of the time for which pay has been made; as fully set forth in the parent application of which this case is a division.

It is a prime object of the present invention to design and produce sending or calling dialing equipment of characteristics such that it may be used in connection with conventional exchange equipment, and substantially or wholly without need of any changes in such exchange equipment. Thereby the features of the present invention may be incorporated into telephone systems of the dialing calling type, or other systems, by substitution of the herein disclosed calling station equipment, in place of equipment presently provided and used for the calling functions. In this connection it is noted that present calling station equipment is such that, when desired, a call to any long distance station, as conventionally termed, may be made from such calling station, by the intervention of the services of the operator at the exchange through which such calling station operates. In the case of such a "long distance" call, the exchange operator is called through use of the dialing unit and connections hereinafter disclosed, using the conventional equipment well known, in large degree, and is given instructions concerning the identity of the person to be called, and the location of such person; whereupon the operator at the calling exchange informs the calling party of the charge for the base time of the desired call, and such other information as may be needed is exchanged between the calling party and the exchange operator.

The equipment herein disclosed includes a caller operated pulsing unit, conveniently of conventional form but modified to make possible the calling of the exchange operator by a special signal, to then enable the caller to request intervention of the exchange operator for purposes already stated. Such modified pulsing unit includes provisions such that when the dialing element is run to its high (or "0") position and then released, pulses (ten in number) are produced, to thereby cause another element of the circuitry to step to its high (or ten position) by which circuit conditions to enable the desired connections to the exchange operator may be produced, including exchange of the proper information to authorize such exchange operator to call the distant party, for completion of the calling operation. It is here noted that such pulsing is produced by conventional pulsing equipment (conveniently of the dial type). Conventionally the circuitry related to such conventional dialing unit is such that the ability of the dialing unit to transmit ten pulses (corresponding to "0") depends on the deposit of the base charge (e.g., ten cents), to cause a bridging connection across the dialing unit contacts, to be removed, so that each step of the dialing unit may produce its pulse. Accordingly, with such circuitry condition, pulsing for the high or ten cent position must be preceded by insertion of the conventional dime. It is, however, desirable, when using such ten cent or high dial position to produce signalling which will call the exchange operator for intervention in making a long distance call, to avoid deposit of such dime prior to making the call to such exchange operator. This condition makes necessary the provision of means to enable the production of the high or ten pulse operation, without need of first inserting the conventional dime, for the preliminary operation. Such special provision is disclosed in the present application.

Specifically, such special provision to enable production of the ten pulses by dialing the high or "0" positions of the dial plate, comprises the introduction of a microswitch into the bridging circuitry which is under control of the ten cent relay. Deposit of ten cents conventionally causes such relay to open contacts which remove the bridge across the pulsing contacts, thus enabling the dialing unit to produce the ten pulses. The microswitch which I have introduced into such bridging circuit, is normally in closed position so that when the relay contacts are closed (no ten cent deposit having been made), the pulsing contacts remain bridged until the relay contacts have been separated by deposit of the dime. The introduction of the microswitch into the bridging circuit makes it possible to remove such bridging of the pulsing contacts by moving such microswitch to its open position when the dialing unit is dialed to its high or ten cent position, leaving the microswitch in its circuit open position during return of the dial plate to its zero position, with production of the desired ten pulses during such returning travel; and provision is then made to shift the microswitch back to its closed circuit position when the home or zero position of the dial plate is attained. Thus the dialing unit is normally in condition for conventional dialing and pulse producing operations.

The desirability of avoidance of need to introduce or make the ten cent payment prior to dialing the operator under the stated circumstances, may arise from various conditions. Normally, however, it is desirable to avoid need for such prepayment in order to signal the exchange operator, will be due to the fact that after reaching the operator, she will inform the caller of the charge for the call which is to be made, and will, thereafter, listen to the characteristic sounds produced by deposit of coins of different denominations, to see that the full and correct amount of pre-payment has been made, prior to completing the long distance call. Had it been necessary to make pre-payment of the dime before being able to reach the operator, an overpayment of the amount of such pre-payment would need be made, unless the further operation of returning the dime to the caller after the operator had given the caller proper information as to the amount to be paid for the call and prior to deposit of such proper amount, should be made.

From the foregoing explanations it will appear that the provision of the modifications to the conventional dialing unit, already briefly stated, bear a definite relationship to portions of the circuitry outside of such dialing unit. I have, therefore, herein illustrated and shall describe such portions of related circuitry as may be needed to understand the special operations possible by use of the modified dialing unit itself.

Other objects and uses of the invention, will appear from a detailed description of the invention, which consists in the features of construction, and combinations of parts, hereinafter described and claimed.

In the drawings:

FIGURE 1 shows a wiring diagram of one embodiment of a portion of the complete equipment at the calling station, the wiring diagram of this figure being a portion of the total, and being usable in connection with the partial wiring diagrams of FIGURES 2 and 3; and FIGURE 1 shows the calling station's conventional telephone unit, including its speaker and its receiver, the dialing unit incorporating the modification previously referred to; and the portion of the wiring circuitry shown in this figure including the special sound signal producing means by which the exchange operator determines the kind and number of coins inserted by the caller at the calling station; and this figure also includes in its showing various of the relays to be hereinafter referred to;

FIGURE 2 shows a downward continuation of the wiring diagram shown in FIGURE 1, being a portion of the wiring diagram directly below that shown in FIGURE 1; and this FIGURE 2 shows the timing unit, the coin receiving element and unit, including the amount of money (value) determining and signalling elements, the coin collect and coin return control elements, and the comparator elements by which the amount of money inserted into the coin receiving unit is compared with the base time pre-pay amount for the called station; and this figure also shows the warning light by which the forthcoming termination of the pre-paid time interval is signalled to the caller;

FIGURE 3 shows the portion of the wiring diagram directly to the right of that portion shown on FIGURE 2, and directly below the lower right-hand corner portion of FIGURE 1; and FIGURE 3 shows the three stepping switches selectors by which the wipers are successively moved, during a dialing operation, to their positions corresponding to the digital values thus dialed during the first three dialing operations by the caller; and this figure shows a typical strapping between the contacts of the successive selectors, being a portion of the circuitry by which the total value of the inserted coins is compared with the base time pre-pay amount for the zone in which the called station is contained; and this figure also shows, at its left-hand location a tabulation of a typical strapping schedule which might be used with the three base time pre-pay called stations; this strapping schedule being used on the three base time pre-pay amounts of fifteen cents, twenty cents, and twenty-five cents; and this left-hand portion of the showing beside FIGURE 3 being conveniently numbered as FIGURE 4;

Figure 6:
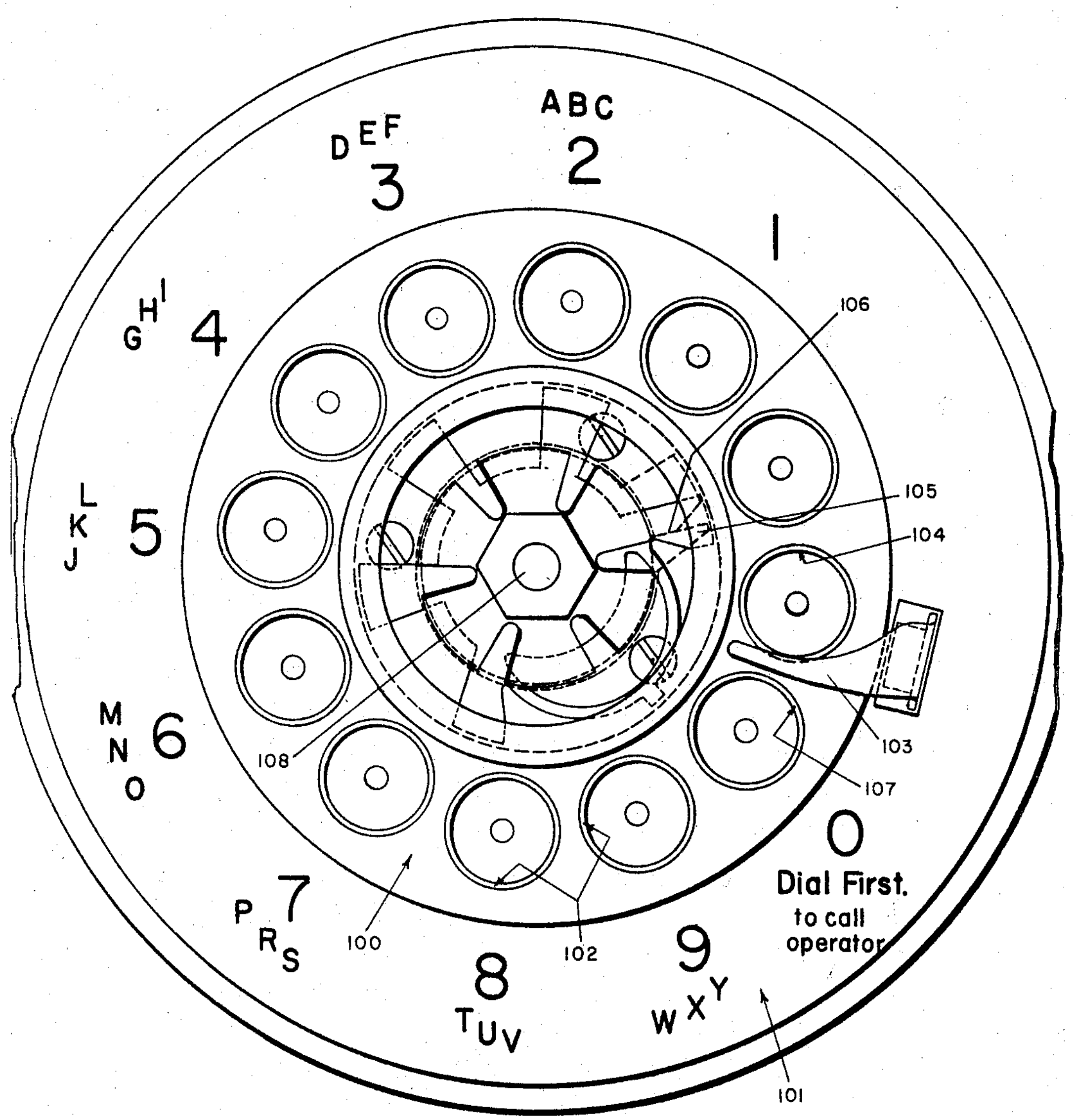
FIGURE 6 shows a face view of a typical dialing unit, showing the "0" or high dialed position which brings into operation the special switching feature presently to be described.
Figure 7:
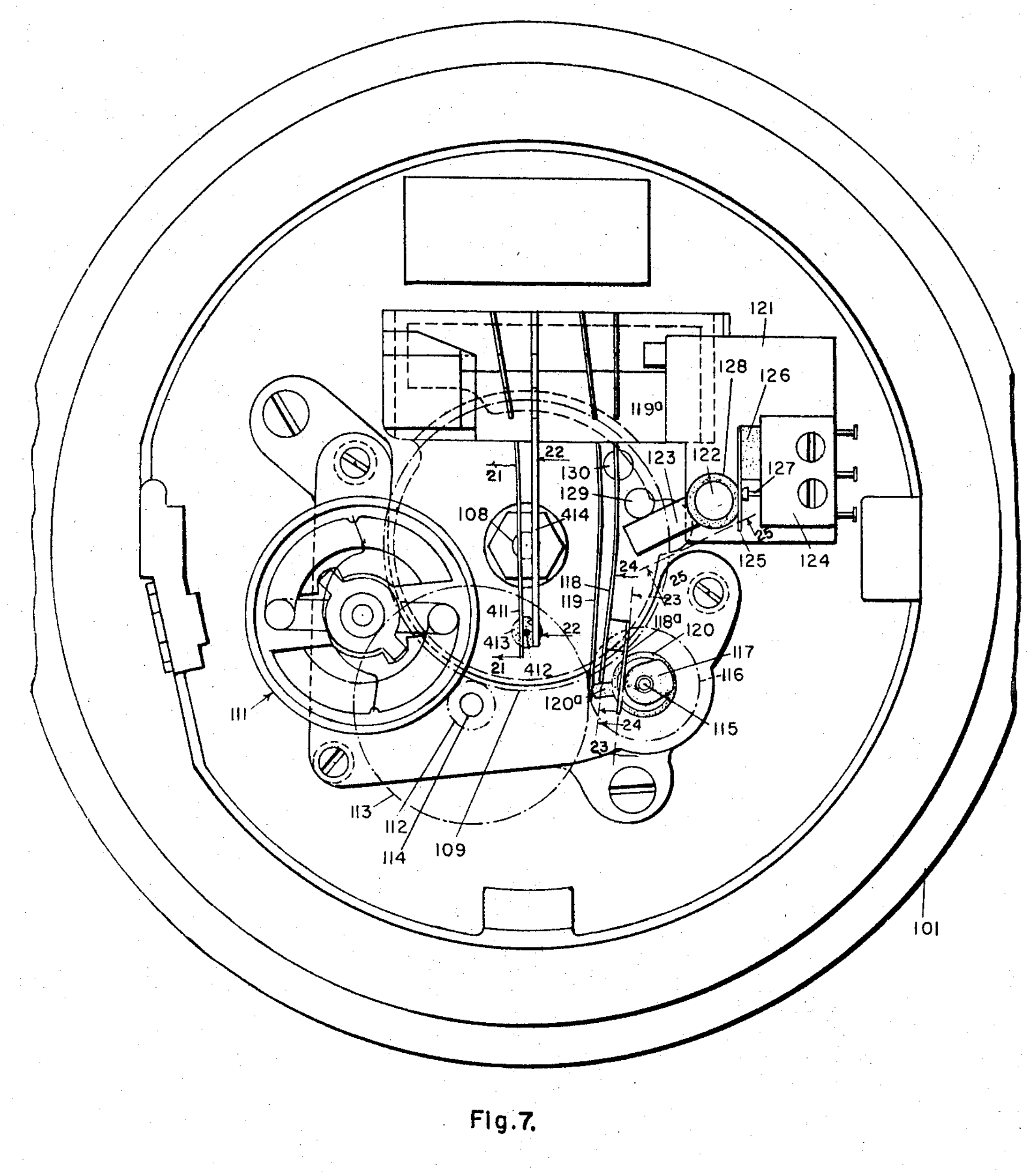
FIGURE 7 shows an inverted or bottom view corresponding to FIGURE 6, the inversion having been made by rotating the dialing unit 180 degrees about an axis extending from top to bottom of FIGURE 6.
Figure 8:
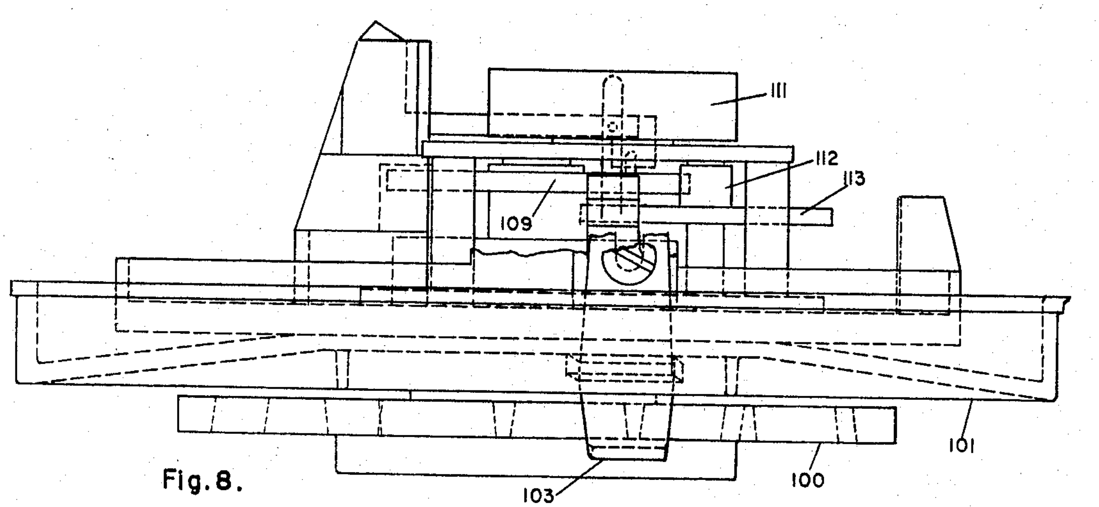
FIGURE 8 shows an edge view looking rightwardly at FIGURE 7.
Figure 9:
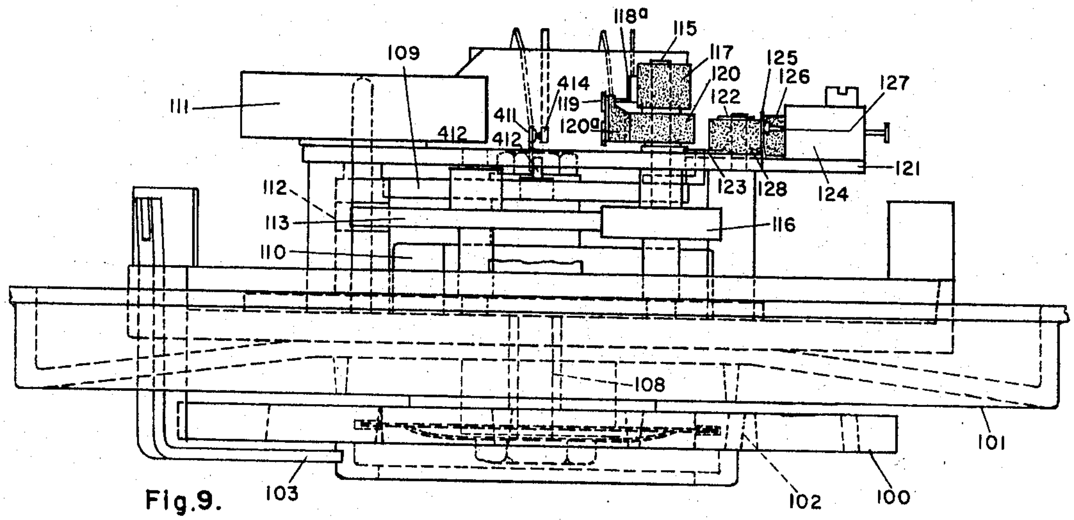
FIGURE 9 shows an edge view looking upwardly at FIGURE 7.
Figure 10:
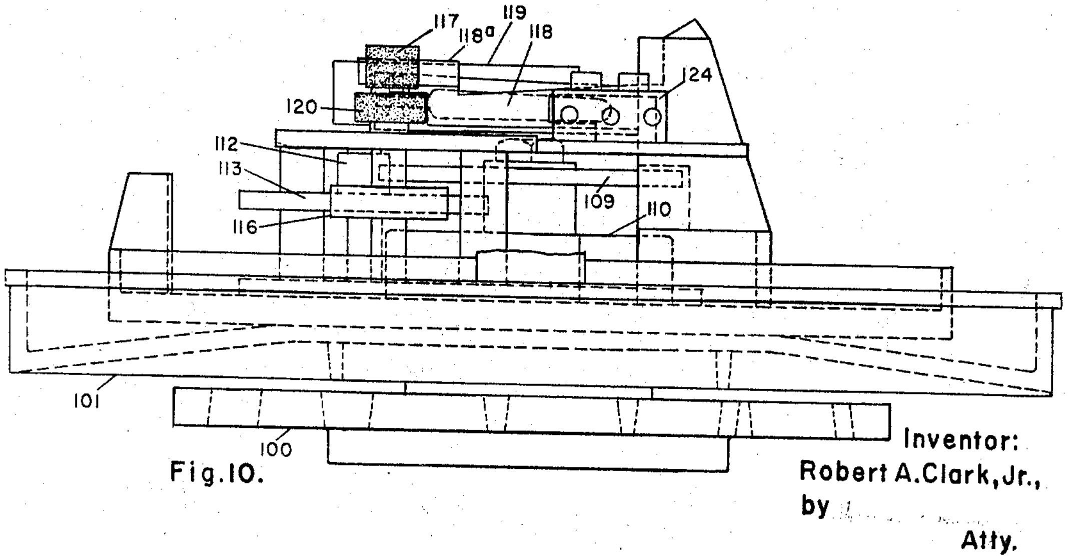
FIGURE 10 shows an edge view looking leftwardly at FIGURE 7.
Figure 19:
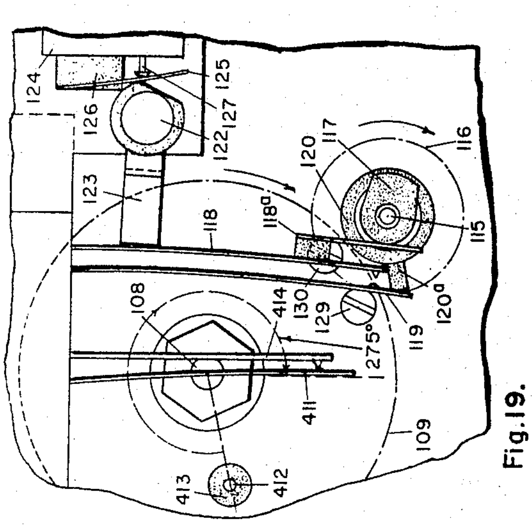
Figure 20:
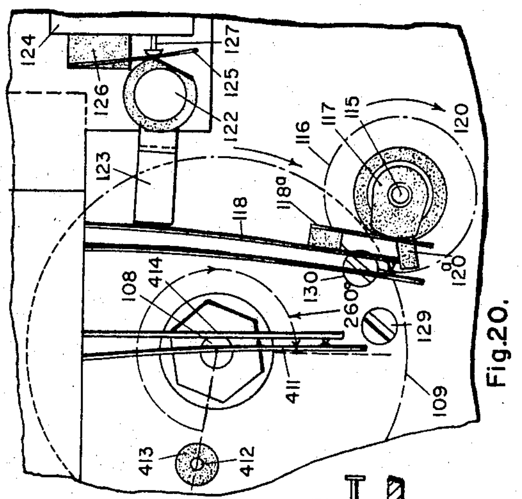
Figure 21:
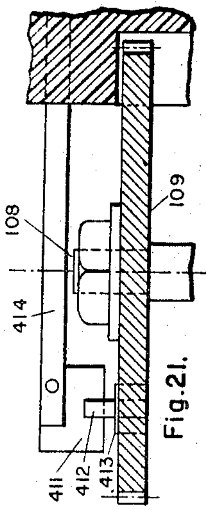
Figure 22:
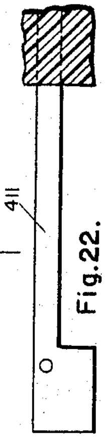
Figure 23:
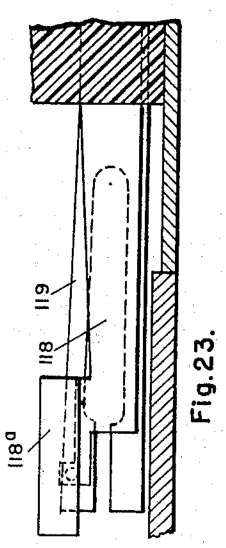
Figure 24:
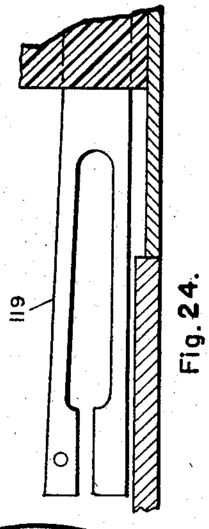
Figure 25:
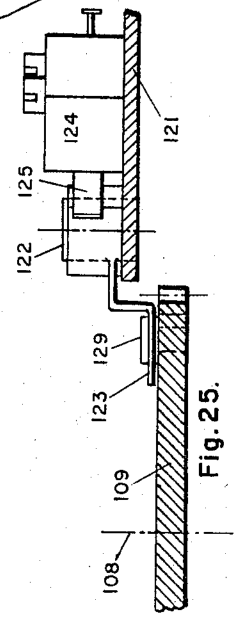
Figure 26:
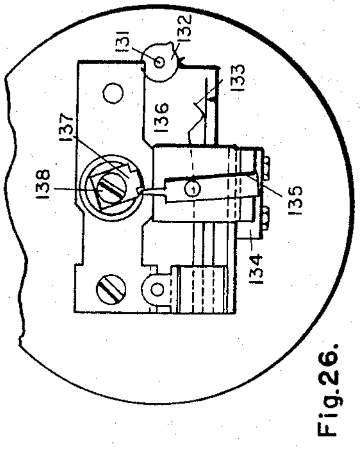
Figure 27:
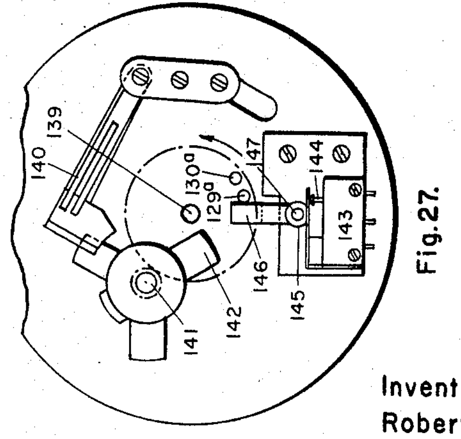

FIGURE 11 shows an enlarged detail view of a portion of the unit more or less in schematic form; and this figure shows the principal contact elements of the dial unit, including the modifications previously referred to; together with the cam and related elements by which the pulsing contacts are operated only during the returning rotational movement when the finger dial is released; and in this figure all of the parts are shown in their normal or fully retracted position, corresponding to the finger released and retracted position of the finger dial shown in FIGURE 6; and the direction of rotational movement of certain parts are shown by the arrows, being the movements during the operation of moving the actuating finger from the "0" or "Dial First to Call Operator" position; clockwise, in FIGURE 6;

FIGURES 12, 13, 14 and 15 show successive positions of the operating parts therein shown, corresponding to microswitch setting rotary movements of substantially 4, 12, 22 and 42 degrees from the "Dial First to Call Operator" position of the finger dial as shown in FIGURE 6, with corresponding 4, 12, 22 and 42 degree counterclockwise movements of the wheel 109, and corresponding counterclockwise movements of the cam shaft 115 shown in FIGURES 11 to 20, inclusive;

FIGURE 16 shows another view corresponding to the views of FIGURES 11 to 15, inclusive, but in FIGURE 16 the parts have been further moved from the "Dial First" position of the finger disk 101 to the 330 degree stopping position of rotation of said finger dial 101, above referred to; this 330 degree position being the terminus of the finger presetting rotary movement, and being limited by a stop, presently to be described; such pre-setting rotary movement of 330 degrees clockwise of the finger dial 101 shown in FIGURE 6, serving to pre-set the microswitch to its open position, leaving it in such open position during the returning, pulse-generating movement of the parts to their zero or normal position; it being noted that such microswitch contacts, as incorporated into the circuitry, are in series with the contacts of a relay conveniently designated as the ten-cent relay, which is normally in closed circuit position;

FIGURES 17, 18, 19 and 20 show successive positions of the parts therein shown, corresponding to returning rotary movements of the finger dial 101, the wheel 109, and the cam shaft 115, to substantially the 309, 290, 275 and 260 degree positions (being positions of those angular values measured from the normal or fully returned position);

FIGURE 21 shows a fragmentary vertical section taken on the line 21—21 of FIGURE 7, looking in the direction of the arrows; and this figure is a detail face view of the two contacts which separate and remain separated during the full rotary movement of the finger dial, beginning immediately at the commencement of such rotary movement; and such contacts again come together upon completion of the returning rotary movement of the finger dial;

FIGURE 22 shows a fragmentary vertical section taken on the line 22—22 of FIGURE 7, looking in the direction of the arrows; and this figure shows the left-hand contact of the pair which is shown in FIGURE 21;

FIGURE 23 shows a fragmentary vertical section taken on the line 23—23 of FIGURE 7, looking in the direction of the arrows; and this figure is a face view looking at the right-hand contact of the pair of contacts which produce the pulsing during the return rotary movement of the finger dial, being counterclockwise in FIGURE 7;

FIGURE 24 shows a fragmentary vertical section taken on the line 24—24 of FIGURE 7, looking in the direction of the arrows; and this figure is a face view of the left-hand contact of the pair shown in FIGURE 23;

FIGURE 25 shows a fragmentary vertical section taken on the line 25—25 of FIGURE 7, looking in the direction of the arrows; and this figure shows the vertical face of the cam element which, at the proper phase of the rotary movements already referred to, acts to shift the micro-switch to its non-biased contact position, this producing a desired operation, presently to be referred to; and in this figure the elevational view of the microswitch is shown in substantially forty-five degree projection;

FIGURE 26 shows a bottom plan fragmentary detail view of a first modified embodiment of the microswitch operating elements; and FIGURE 27 shows a bottom plan fragmentary detail view of a second modified embodiment of the microswitch operating elements.

In FIGURES 6 to 10, inclusive, I have shown one conventional form of dial type, pulse producing unit, modified to include additional or substitute elements to enable such unit to meet the special operating conditions imposed by a specialized function, imposed by operating conditions within certain circuitry which is fully disclosed in the parent application. I have included in this case such circuitry, as under operational conditions the modifications of the dialing unit bear a special relation to other elements of such circuitry. The circuitry in question is as shown in FIGURES 1, 2, 3 and 5, to which reference will be made. FIGURES 11 to 20, inclusive show the successive positions to which the elements of the conventional dialing unit move, in comparison with the modifications needed to meet special operational conditions. Detailed description of the conventional dialing unit is not deemed necessary, especially since such description would largely repeat structures well known in the art of telephony and elsewhere. The following brief statement of the structure and its operations is, however proper to better understand the additional operations produced by the modifications:

Reference is made to FIGURES 6, 7, 8, 9 and 10. Each dialing operation produced by insertion of a finger into one of the openings 104 (e.g., the "6" opening), followed by clockwise drive of the dial plate 100 until the finger comes to the stop 103 produces counterclockwise rotation of the shaft 108 (see FIGURE 7 which is an upside down view), with corresponding rotation of the gear 109 which meshes with a pinion on the shaft 110ª, a one-way clutch being included between such pinion and shaft so that during such setting operation the pinion rotates free of the shaft. Spring means (not shown) winds during this setting operation, but the wheel 111 may remain idle during this operation. Upon releasing the finger pressure, the dial plate 100 is returned to its zero or home position by such spring means, the wheel 111 being driven therewith; but a speed governor is provided within the wheel to limit its returning speed and hold such speed substantially constant.

A shaft 115 is journalled proximate to the periphery of the gear 109. Another shaft 114 is also journalled proximate to the gear 109, and carries a pinion 112 meshing with such gear 109. Such shaft 114 also carries a gear 113 which meshes with a pinion 116 carried by the shaft 115. Accordingly, the shaft 115 is driven (rotated) back and forth proportionately to the angular movements of the gear 109, the shaft 108, and the dial plate 100.

Mounted on the shaft 115 is the block of insulating material 120, such mounting being of nature to allow rotation of the shaft without drive of the block 120 (being a slip-drive), but with sufficient friction to ensure proper functioning of the parts as hereinafter explained. A cam block 117, also of insulating material, a drivingly carried by the upper end of the shaft 115, above such block 120, the drive of the cam block being positive, and ensuring unchanging angular relation between such cam block and the shaft 115.

The two pulsing contacts 118 and 119 of spring material, are anchored to a block of insulating material 119ª (see FIGURE 7), such contacts being of leaf form and biased to remain normally disengaged from each other as shown in FIGURE 7. The outer end portions of such leaf contacts are in planar alignment with the block 120; and such block 120 is provided with the radially extending foot 120ª of radial dimension such that whenever the left-hand contact 119 is freed to return rightwardly by retraction of the contact 118 (as presently to be explained), such contact 119 will be restrained from following the contact 118 rightwardly, with consequent opening a circuit which includes such contacts 118 and 119. On the contrary, whenever such foot 120ª is rotated counterclockwise from its position shown in FIGURES 7, 11, 18, 19 and 20, the contact 119 is free to follow the contact 118 rightwardly, with such contacts in engagement with each other, such circuit then being closed at the position of such contacts. Accordingly, under this set of conditions, wherein the foot 120ª is moved away from its position of interference with the rightward movement of the contact 119, successive leftward and rightward movements of the contact 118 will not cause successive closing and opening circuit operations, but the circuit will remain closed during such operations. Again, however, when once the contact 119 has been locked in its leftward postion, and the foot 120ª has been brought into the path of rightward movement of such contact 119, to produce such locking condition, such contact 119 is retained leftward far enough to ensure that normal rightward movements of the contact 118 from its condition of engagement with the contact 119, will produce circuit openings as the high point of the cam block 117 moves away from engagement with such contact 118, and circuit closings each time the high point of the cam block shifts the contact 118 leftwardly.

The successive operations of this type of pulse generator will be better understood from the following statement respecting the successive operations, shown in FIGURES 11 to 20, inclusive, as follows:

The direction of parts rotations are shown by the arrows in the several figures. FIGURE 11 shows the parts in their initial or normal position, prior to starting the dialing operation. This set of figures shows the parts in their successively moved positions, commencing with the insertion of the finger into the opening 104 (see FIGURE 6), next to the stop 103, and carrying the finger clear around to the back side of that same stop, shown by the opening 107, being the high point of the dialing operation, followed by returning movements back to the starting position. Examination of FIGURE 16 indicates that the high rotated point is 330 degrees from the start, thus allowing 30 degrees unused, being needed for accommodation of the structural elements. The following succession of operations occurs:

At the zero or unoperated position the foot 120ª stands in position to retain the contact 119 leftwardly, the high-point of the cam block being away from the contact 118, so that such contacts are separated as shown in FIGURE 11. During the counterclockwise finger movement of the dial plate 100 the shaft 115 is rotated counterclockwise as shown by the arrows in FIGURES 11 to 15, inclusive, FIGURE 16 being the high point where reversal of rotation occurs. During the first few degrees of setting direction movement, the foot 120ª moves far enough to release the contact 119, which then engages the contact 118, as shown in FIGURE 12. The continued rotational movement of the shaft 115 counterclockwise, carries the foot 120ª counterclockwise through the position of FIGURE 13 to FIGURE 14 wherein such foot engages the face of the contact 118 and is arrested thereby. However, further counterclockwise rotation of the shaft 115 is permitted without corresponding rotation of the block 120 and foot 120$^a$ due to the frictional drive from the shaft 115 to such block. Thus from position of FIGURE 14 to position 16 the shaft rotations may occur, with the foot 120$^a$ non-engaged with the contact 119, permitting such contact to move back and forth with the contact 118, as produced by the successive rotations of the shaft 115. No pulses will be delivered during these movements. Accordingly, between the positions of FIGURES 14 and 16 there may and do occur successive back and forth movements of the pair of contacts 118 and 119, corresponding to the rotation of the finger dial plate 100 to its high position, designated "0" in FIGURE 6, without delivery of any pulses by successive openings and closings of such contacts.

Figure 1:
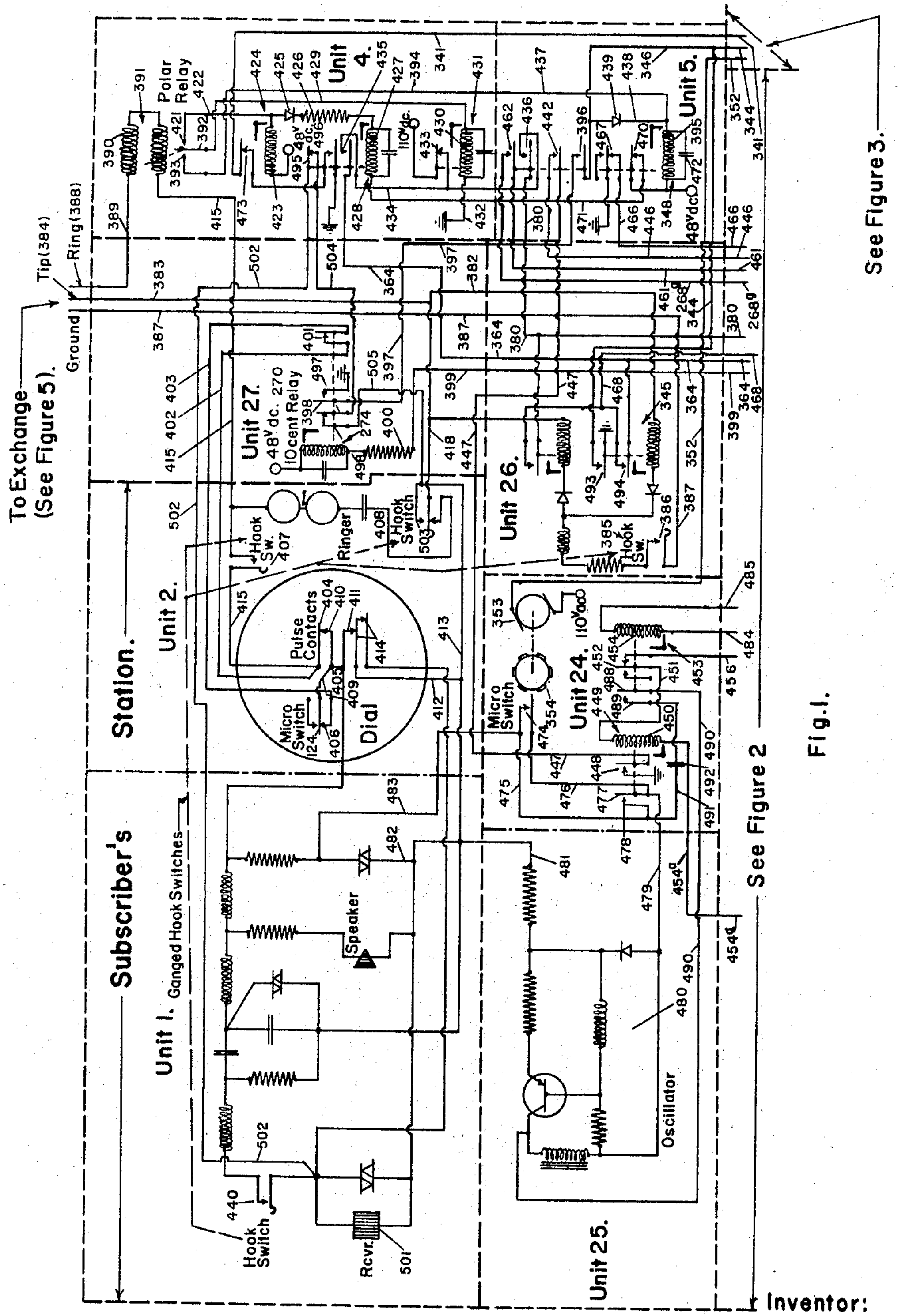
Figure 2:
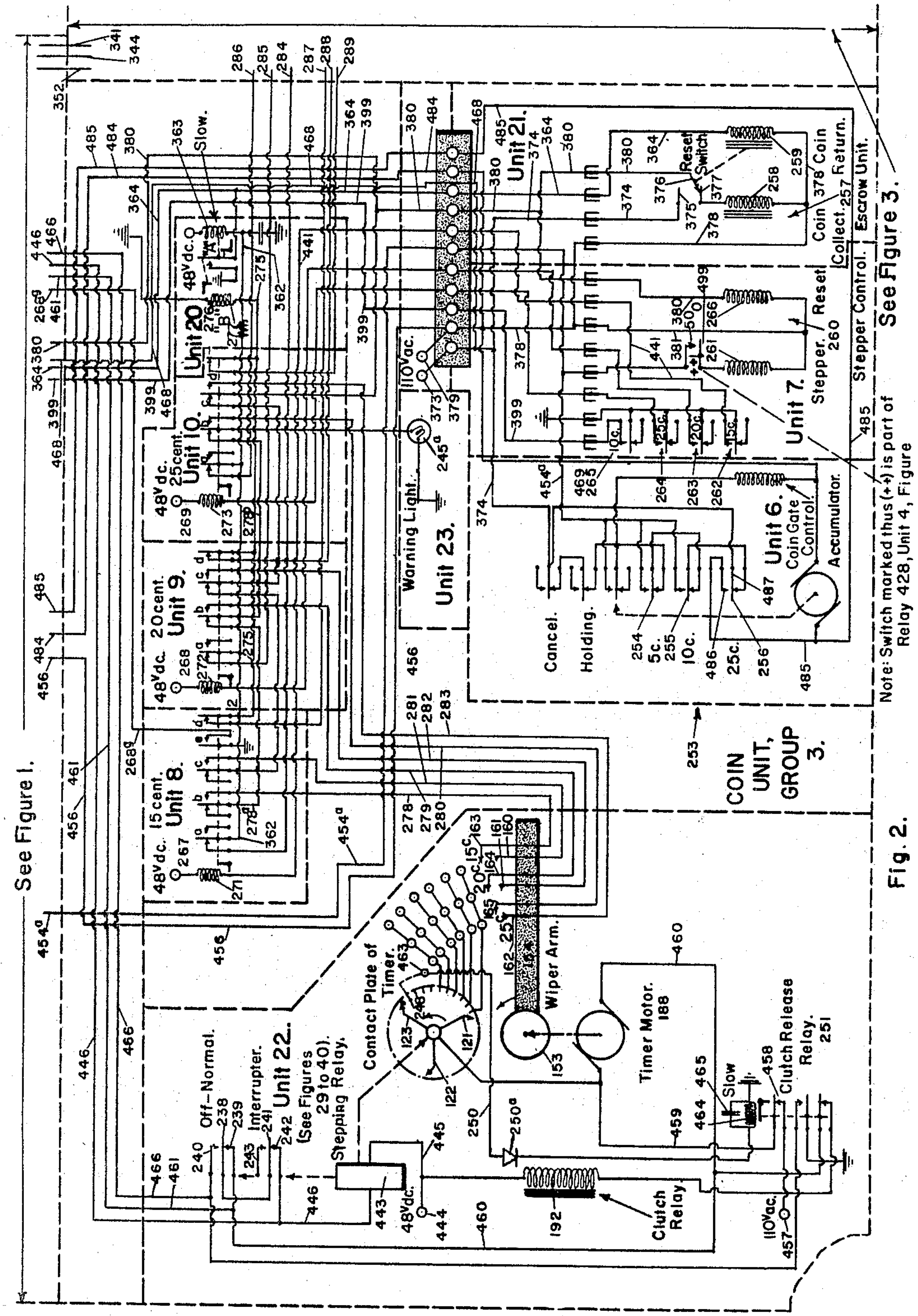

During this operation the contacts 401 of the "Ten Cent" relay Unit 27 of FIGURE 1, have remained closed, due to non-payment of the conventionally required ten cent deposit for a local call. But since the contacts 118 and 119 have not been delivering successive openings and closings of the pulsing circuit, in which circuit both the pulsing contacts 118 and 119, and the ten-cent relay contacts 401 are included in series, as a bridge, no pulses have been delivered. Normally, according to circuitry which does not include the present improvements, the return rotational movement of the dial plate to its zero or home position, will produce pulses, due to the following further conditions as now analyzed, in the dialing unit:

As soon as the return rotational movement of the dialing plate commences the rotation of the shaft 115 reverses, as shown by the arrows in FIGURES 17, 18, 19 and 20. During such reversed rotation the following functions occur: passing from FIGURE 16 to 17 the block 120 and foot 120$^a$ have reversed direction thus carrying the foot from engagement with the contact 118 and into engagement with the end of contact 119 where further rotational movement of such block 120 and foot 120$^a$ are arrested, momentarily, while rotation of the shaft 115 proceeds, due to the friction drive from such shaft to such block 120. Promptly thereafter the high point of the cam block 117 will come into engagement with the contact 118 (FIGURE 18), thus driving both of the contacts 118 and 119, still engaged with each other, to the position of FIGURE 18, wherein the foot 120$^a$ has engaged the end of the contact 118, thus arresting further rotational movement of such block and the foot 120$^a$, during the remaining amount of rotational movement of the dial plate. Thus, each time the high point of the cam, rotating clockwise now, passes away from the contact 118, engagement of such contact with the contact 119 will terminate momentarily, causing a pulse to be delivered through the corresponding circuit, provided the contacts 118 and 119 are not bridged by some parallel circuit; it being noted that, the contacts 401 of the ten cent relay have not been opened (no ten cent payment having been made), and it being also assumed that the bridging circuit which thus includes such ten-cent relay, has not been otherwise opened. But, since such ten-cent relay has not been opened, and also assumed that such bridging circuit is elsewhere closed, the successive openings and closings of the contacts 118 and 119 will not deliver any pulses for intended use. The following provisions have, however, been made:

The microswitch 124 having the contacts 406, is mounted close to the gear wheel 109 which is connected to the finger disk shaft 108. Such mounting is conveniently produced by the bracket plate 121 carried by a stationary part proximate to the edge of such gear wheel. An arm 123 is pivotally mounted on the stud 122 carried by such bracket plate (see FIGURE 7), for rock of such arm back and forth under control of the rotational movements of such gear wheel. Such arm has its hub portion close to the spring leaf 125 which is mounted stationary close to the microswitch, and which leaf, when depressed, acts against the stud 127 of the microswitch, depressing the same, and thus changing the contacts of the switch, and holding them in changed condition as long as such changed position of the arm 123 exists. For the purpose of producing such shifts the hub of the arm is provided with a flattened area against which the leaf 125 normally engages; but as the hub is rotated, the full diameter thereof engages the leaf 125, producing the desired function. Such leaf 125 is normally biased outwardly, to retain engagement with the hub at all times.

The gear wheel 109 carries the two studs 129 and 130 on its upper surface, in position to engage the arm 123 as follows:

During the rotation of the dial plate shaft 108 in the setting direction (by finger operation), rotation of the gear wheel is counterclockwise as shown by the arrows in FIGURES 11 to 15, inclusive. This carries the studs around to bring the stud 130 into engagement with the under edge of the arm 123, rocking it upwardly (in various of the figures), to thus reverse the contacts of the microswitch. Due to friction of the arm 123 on its stud 122, the parts will remain in such reversed condition until purposely restored to their original condition. When the dial plate is released (being then at its high or "0" position), rotation of the gear wheel will reverse, carrying the studs back to their original positions. Just at completion of such movement the stud 129 will engage the top edge of the arm 123, thus rocking it back to its original position, and restoring the contacts of the microswitch to their original condition. These contacts are interposed into the bridging circuit in series with the contacts 401 of the ten-cent relay. These contacts are normally closed, as shown in FIGURE 1, Unit No. 2. Since it has been assumed that the ten-cent relay is in its position shown in FIGURE 1, it is seen that returning movement of the dialing plate cannot produce pulses unless either the ten-cent relay or the microswitch is moved to position to open its contacts comprising portions of the bridging circuit across the pulsing contacts 118 and 119.

Under normal dialing operations the identification code numbers will not include the high or "0" digit. Therefore the microswitch contacts will normally remain closed. Also, under normal dialing operations it will be necessary to first deposit the base charge of ten cents (or other determined base amount). This will activate the relay 274 (ten-cent relay) to open its contacts 401, retaining them open until the conversation has been terminated, with collect of the deposited amount, and hang up of the receiver has been made, or other terminating operation, such as conclusion of the paid time interval including extensions thereof, has occurred. The opening of the contacts 401 of such ten-cent relay will condition the circuitry for any needed pulsing operations.

I have already made reference to the calling of the exchange operator for intervention in making a long distance call. Such intervention involves both the calling of such operator by the calling party, and also making provision for enabling the operator to determine whether or not the calling party has inserted the proper amount of coins to cover the base charge of such long distance call. Both of these operations are provided for in connection with the ability to produce the ten pulses during the returning movement of the dial plate, already explained. Such provisions are as follows:

The ten pulses are transmitted to the first selector Units 17, 18 and 19 of FIGURE 3 (also legened "1st Selector") in such figure. Such pulse transmission is produced over the line 341 to the selector stepping coil 202$^a$ from the contacts 473 of the relay 424, Unit 4, FIGURE 1. Such contacts, when closed, produce a ground connection for such magnet 202$^a$. The pulsing of such contacts are produced by pulsings of the polar relay 391, causing its tongue 392 to shift back and forth against and from engagement with the relay contact 421. Each such contacting produces a circuit from 48$^v$ input, through relay coil 423, line 422, polar relay contact 421, relay tongue 392, line 429, relay coil 430, and connection 432 to ground, it being noted that 48$^v$ input is supplied to the stepping relay magnet, 1st Selector, FIGURE 3.

Figure 5:
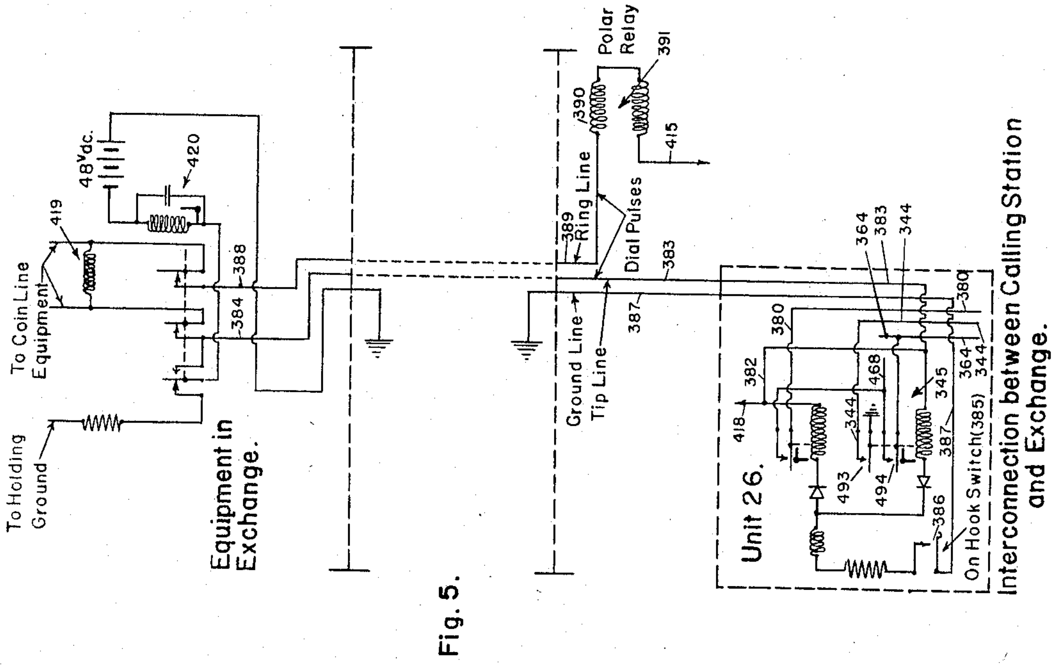
FIGURE 5 shows a portion of the circuitry contained in the exchange to which the calling station in question is connected, to facilitate understanding of the functioning of portions of the presently disclosed dialing unit and circuitry.

The pulsing of the polar relay is produced in conventional manner by delivering the pulses over the line 415 (the hook contacts 407 of the caller's receiver), to the polar relay coils 390, and thence over the ring line 388 to the calling party exchange (FIGURE 5). In the exchange, conventional equipment is used to signal the operator for her attention to the calling party's requirements.

The stepping of the 1st Selector also activates circuitry to enable production of the characteristic signals to the exchange operator for her information as to the number and denominations of coins paid into the coin receptacle by the calling party, after the exchange operator has informed the caller as to the amount of the charge to be paid. The following elements and circuitry are provided for this purpose:

The stepping of the 1st Selector to its high position, already explained, brings the ground connection 360 into engagement with the high point stationary contact 351 (FIGURE 3), to which the line 352 is connected. Such line 352 is carried over to the Unit 24, FIGURE 1 where such line connects to one side of the small motor which drives the signal puse generator 354, which then continues to operate until the 1st Selector is returned to its base or home position. The pulsing signals from the element produce characteristic note signals which are emitted corresponding to each coin deposited, and of note characteristic to the denomination of the coin so deposited, all such signals being delivered to the operator at the calling party's exchange.

In FIGURE 26 I have shown, more or less schematically, certain operating parts of a conventional dialing unit, being a product of Stromberg-Carlson Company, of Chicago, Illinois, modified to include the switching functions already described in detail. In this case the shaft 131 is rotated once for each digit dialed, thus causing the cam 132 to cause the switch leaf to function for production of a single pulse corresponding to each digit so dialed. Such leaf switch 133 is normally closed, and is moved to open circuit position once corresponding to each digit. The microswitch 134 is located on a convenient stationary part; and the rock arm 135 is pivoted to a stationary part (shown as pivoted to the microswitch carrier 136). A stud or finger 137 is pivoted for rock on a pivotal point 138; and suitable means are provided for rocking such element 137 in either direction, with rock in one direction when a full rotational movement of the dial plate for "0" dialing is desired, to thus throw the microswitch into one switching position, and with rock back to the normal position of such element 137 at the completion of the returning movement of the dial plate from such "0" position, with return of the microswitch to its normal or original position.

In FIGURE 27 I have shown, more or less schematically, certain operating parts of another conventional dialing unit, being a product of North Electric Company, of Chicago, Ill. In this case the shaft 139 rotates in phase with the rotations of the dial plate, back and forth as already explained. The contacts shown at 140 comprise a portion of the pulsing circuitry, and are normally closed. Pulsing is produced by rotation of the three bladed wheel element 141, geared to the wheel 142 which is carried by the shaft 139. The microswitch element 143 is mounted close to such wheel 142 and with its leaf contact actuating pin extending towards such wheel 142, as shown at 144. The cam block 145 is carried by the rock arm 146 pivoted to a stationary part at 147; and the studs 129$^a$ and 130$^a$ are mounted on such wheel 142 in positions proper to ensure the shifting of the microswitch to its reversed position only when the dial plate is operated from its "0" position to separate the contacts 404 and 410 (FIGURE 1) only when such "0" dialing position is used.

Evidently other forms of dialing and pulsing unit than those hereinbefore described, may be modified to meet the requirements of the present invention.

I claim:

1. A telephone system including a calling station and an exchange to which said calling station is connected; pulse producing means in the calling station including a manually settable dialing element, settable to successively higher pulse producing positions, to a highest position, including spring means urging return of said dialing element to a base or starting position; said pulse producing means including relatively movable contacts and operative means between the dialing element and said contacts, including means constituted to permit movement of the dialing element from its base position to any manually selected dialing position while the contacts are engaged with each other in a circuit element closed position, and constituted to cause successive separations of the contacts with intermediate closings of the contacts together with corresponding circuit pulsing functions during return of the dialing element to its base or starting position; a bridging circuit connected across said pulsing contacts, and including contacts of a first defined relay element including relay means to move said contacts between a closed circuit position and an open circuit position; said bridging circuit also including a second defined switch element including contacts movable between a closed circuit position and an open circuit position, both said relay contacts and said second defined switch element contacts being in series connection in said bridging circuit across the pulsing contacts; operative connections between the manually settable dialing element and the second defined switch element contacts, constituted to move said second defined switch contacts to open circuit position when the dialing element is moved to its highest position with said contacts in open circuit condition during return of the dialing element to its base or starting position, and constituted to enable movement of said contacts to close circuit position when the dialing element is returned to its base or starting position.

2. A telephone system as defined in claim 1; together with coin or token receiving means; and connections between said coin or token receiving means and the relay constituted to cause the relay contacts to be in open circuit position when a coin or token is inserted into such coin or token receiving means.

3. A telephone system as defined in claim 2; wherein the relay contacts are in closed circuit position when the coin or token receiving means is inoperative.

4. A telephone system as defined in claim 1; together with a stepping relay provided with a movable contact movable proportionately to the number of pulses delivered to it, and also including stationary contacts proportionate to the pulsed positions of such movable contact; wherein a stationary contact is engaged by the movable contact when a number of pulses is delivered to such stepping relay corresponding to the number of pulses delivered by the pulse producing means during return of the dialing element from its highest position to its base or starting position; exchange operator signalling means in the exchange; and connections between the stationary contact corresponding to the highest number of pulse produced movements of the movable contact of the stepping relay, and such exchange operator signalling means, constituted to activate such signalling means when the movable contact receives pulses corresponding in number to the movement of the dialing element from its highest position to its base or starting position.

5. A telephone system as defined in claim 1; together with a stepping relay provided with a movable contact movable proportionately to the number of pulses delivered to it, and also including stationary contacts proportionate to the pulsed positions of such movable contact; wherein a stationary contact is engaged by the movable contact when a number of pulses is delivered to such stepping relay corresponding to the number of pulses delivered by the pulse producing means during return of the dialing element from its highest position to its base or starting position; exchange operator coin or token identifying means in the exchange; and connections between the stationary contact corresponding to the highest number of pulse produced movements of the movable contact of the stepping relay, and such exchange operator coin or token identifying means, constituted to activate such coin or token identifying means when the movable contact receives pulses corresponding in number to the movement of the dialing element from its highest position to its base or starting position.

6. As a new article of manufacture, a pulse producing unit including a manually settable dialing element, settable to successively higher pulse producing positions, to a highest position, including spring means urging return of said dialing element to a base or starting position; said pulse producing means including relatively movable contacts and operative means between the dialing element and said contacts, including means constituted to permit movement of the dialing element from its base position to any manually selected dialing position while the contacts are engaged with each other in a circuit element closed position, and constituted to cause successive separations of the contacts with intermediate closings of the contacts together with corresponding circuit pulsing functions during return of the dialing element to its base or starting position; a second defined switch element including contacts movable between a closed circuit position and an open circuit position; operative connections between the manually settable dialing element and the second defined switch element contacts, constituted to move said second defined switch element to a first circuit position when the dialing element is moved to its highest position with said contact in such first circuit position during return of the dialing element to its base or starting position, and constituted to enable movement of said contacts to a second circuit position when the dialing element is returned to its base or starting position.

7. As a new article of manufacture, the structure as defined in claim 6, wherein the first circuit position is an open circuit position, and the second circuit position is a closed circuit position.

References Cited

UNITED STATES PATENTS 2,890,287 6/1959 Goldschmidt ---------- 179—90

KATHLEEN H. CLAFFY, *Primary Examiner.*

H. ZELLER, *Assistant Examiner.*